(12) United States Patent
Jiang et al.

(10) Patent No.: US 12,189,248 B2
(45) Date of Patent: Jan. 7, 2025

(54) DISPLAY PANEL WITH OVERLAPPING WIRING AND COMMON ELECTRODE LAYER

(71) Applicant: Shenzhen China Star Optoelectronics Semiconductor Display Technology Co., Ltd., Guangdong (CN)

(72) Inventors: Kunkun Jiang, Guangdong (CN); Meng Wang, Guangdong (CN)

(73) Assignee: SHENZHEN CHINA STAR OPTOELECTRONICS SEMICONDUCTOR DISPLAY TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 17/756,462

(22) PCT Filed: May 13, 2022

(86) PCT No.: PCT/CN2022/092644
§ 371 (c)(1),
(2) Date: May 25, 2022

(87) PCT Pub. No.: WO2023/206612
PCT Pub. Date: Nov. 2, 2023

(65) Prior Publication Data
US 2024/0168346 A1 May 23, 2024

(30) Foreign Application Priority Data
Apr. 27, 2022 (CN) .......................... 202210454734.1

(51) Int. Cl.
*G02F 1/1362* (2006.01)
*G02F 1/1333* (2006.01)
(Continued)

(52) U.S. Cl.
CPC .. *G02F 1/136286* (2013.01); *G02F 1/133388* (2021.01); *G02F 1/1345* (2013.01);
(Continued)

(58) Field of Classification Search
CPC ....... G09G 1/136218; G09G 1/133388; G09G 2201/121; G09G 3/3655; G09G 2300/0413
See application file for complete search history.

(56) References Cited

U.S. PATENT DOCUMENTS 10,001,640 B1 6/2018 Kumar
2014/0267999 A1 9/2014 Kim
(Continued)

FOREIGN PATENT DOCUMENTS

CN 104701352 A 6/2015
CN 105895637 A 8/2016
(Continued)

OTHER PUBLICATIONS

Korean Office Action issued in corresponding Korean Patent Application No. 10-2022-7021561 dated Aug. 30, 2023, English Translation starts at p. 7.
(Continued)

*Primary Examiner* — Paisley L Wilson (57) ABSTRACT

An embodiment of the present application discloses a display panel including an array substrate including a common wiring. The common wiring includes a first wiring, the first wiring is disposed in a redundancy pixel region. An opposite substrate includes a common electrode layer disposed in a display region and a redundancy pixel region. Along a thickness direction of the display panel, the first wiring overlaps the common electrode layer. When the display panel is in a display state, an absolute value of a difference between a voltage inputted to the first wiring and a voltage
(Continued)

inputted to the common electrode layer ranges from 0 to 1 volt.

16 Claims, 5 Drawing Sheets

(51) Int. Cl.
    *G02F 1/1345*     (2006.01)
    *G02F 1/1368*     (2006.01)
    *G09G 3/36*     (2006.01)

(52) U.S. Cl.
    CPC .. *G02F 1/136218* (2021.01); *G02F 1/136222* (2021.01); *G02F 1/1368* (2013.01); *G02F 2201/121* (2013.01); *G09G 3/3655* (2013.01); *G09G 2300/0413* (2013.01)

(56) References Cited

U.S. PATENT DOCUMENTS

| | | | | |
|---|---|---|---|---|
| 2014/0292626 | A1* | 10/2014 | Park | G09G 3/3611 |
| | | | | 345/87 |
| 2014/0300852 | A1* | 10/2014 | Yoshida | G02F 1/134336 |
| | | | | 349/143 |
| 2016/0209685 | A1* | 7/2016 | Tomikawa | G02F 1/1333 |
| 2020/0019025 | A1 | 1/2020 | Ye | |

FOREIGN PATENT DOCUMENTS

| | | | |
|---|---|---|---|
| CN | 107978622 | A | 5/2018 |
| CN | 112230480 | A | 1/2021 |
| JP | 2007147793 | A | 6/2007 |
| JP | 2016057592 | A | 4/2016 |
| JP | 2019090935 | A | 6/2019 |
| JP | 2020091318 | A | 6/2020 |
| KR | 19990074540 | A | 10/1999 |
| KR | 20140123137 | A | 10/2014 |
| KR | 20200111217 | A | 9/2020 |
| WO | 2013077262 | A1 | 5/2013 |

OTHER PUBLICATIONS

International Search Report in International application No. PCT/CN2022/092644, mailed on Nov. 28, 2022.

Written Opinion of the International Search Authority in International application No. PCT/CN2022/092644, mailed on Nov. 28, 2022.

Japanese Office Action issued in corresponding Japanese Patent Application No. 特願2022-529966 dated Aug. 20, 2024, pp. 1-4.

* cited by examiner

DISPLAY PANEL WITH OVERLAPPING WIRING AND COMMON ELECTRODE LAYER

FIELD OF INVENTION

The present application relates to a field of display technologies, especially to a display panel.

BACKGROUND OF INVENTION

In a liquid crystal display panel, on an outer edge of a display region, an alignment film and a black matrix are disposed on a color filter substrate. The alignment solution spreads from the display region to a non-display region. When the alignment solution spreads out of the display region, due to an effect of a partitioning pad, the alignment solution would accumulate and back-flow around the display region, which causes an uneven film thickness. Under an ultraviolet effect, an alignment of liquid crystals corresponding to the display region achieves an expected goal. The non-display region is covered by the black matrix. However, under effects of diffraction of the ultraviolet, later environmental variation, and a backlight light source, the alignment film with an uneven thickness and liquid crystals on an outer edge of the display region are aligned once again, which effects the display region to cause a phenomenon of uneven brightness of the edge of the display region.

SUMMARY OF INVENTION

Technical Issue

An embodiment of the present application provides a display panel that can lower a risk of an edge of a display region edge having uneven brightness.

Technical Solution

The embodiment of the present application a display panel, comprising a display region and a redundancy pixel region located on at least one side of the display region, wherein the display panel comprises:
an array substrate comprising a first base and a common wiring disposed on the first base, wherein the common wiring comprises a first wiring, and the first wiring is disposed in the redundancy pixel region;
an opposite substrate disposed opposite to the array substrate, wherein the opposite substrate comprises a second base and a common electrode layer disposed on a side of the second base near the array substrate, and the common electrode layer is disposed in the display region and the redundancy pixel region; and
a liquid crystal layer, the liquid crystal layer disposed between the array substrate and the opposite substrate and extending in the redundancy pixel region and the display region, wherein the liquid crystal layer in the redundancy pixel region is located between the first wiring and the common electrode layer;
wherein along a thickness direction of the display panel, the first wiring overlaps the common electrode layer, when the display panel is in a display state, under a L0 grayscale of a viewing angle of 0 degree, image brightness of an overlapping region between the first wiring and the common electrode layer ranges from 0 to 0.0017 lux.

Optionally, in some embodiments of the present application, the array substrate further comprises a thin film transistor array layer, an insulation layer, and a pixel electrode layer, the thin film transistor array layer is disposed on the first base, the insulation layer is disposed on the thin film transistor array layer, and the pixel electrode layer is disposed on the insulation layer; and
the pixel electrode layer comprises a pixel electrode and a redundancy pixel electrode, the pixel electrode is disposed in the display region, the redundancy pixel electrode is disposed in the redundancy pixel region, and at least one part of the redundancy pixel electrode is multiplexed as a part of the first wiring.

Optionally, in some embodiments of the present application, the first wiring further comprises a connection portion, and in the redundancy pixel region, the connection portion is connected between the first wiring and the redundancy pixel electrode to form an entire plate structure or a patterned structure.

Optionally, in some embodiments of the present application, the display panel further comprises an outer periphery region, the outer periphery region surrounds an outer periphery side of the display region, the redundancy pixel region is disposed between the outer periphery region and the display region, the common wiring further comprises at least one second wiring, the at least one second wiring is disposed in the outer periphery region, the array substrate further comprises a bonding pad disposed on the first base, the bonding pad is located on a side of the outer periphery region, an end of the second wiring is connected to the first wiring, and another end of the second wiring is connected to the bonding pad.

Optionally, in some embodiments of the present application, an edge of the first wiring surrounding the display region forms a closed loop structure.

Optionally, in some embodiments of the present application, the second wirings comprise a first sub-line and a second sub-line, the bonding pad comprises a first bonding pad and a second bonding pad, an end of the first sub-line is connected to a side of the first wiring away from the bonding pad, another end of the first sub-line is connected to the first bonding pad, an end of the second sub-line is connected to a side of the first wiring near the bonding pad, and another end of the second sub-line is connected to the second bonding pad.

Optionally, in some embodiments of the present application, in adjacent two of the second sub-lines, the two the second sub-lines commonly share a partial section, the partial section commonly shared is a common line section, and the common line section is located on a side near the first wiring and is connected to the first wiring.

Optionally, in some embodiments of the present application, the thin film transistor array layer further comprises scan line; the common wiring further comprises a third wiring connected to the first wiring, the third wiring is parallel to the scan line extension direction, and the third wiring overlaps the common electrode layer.

Optionally, in some embodiments of the present application, the thin film transistor array layer further comprises a data line, the common wiring further comprises a fourth wiring connected to the first wiring, the fourth wiring is connected to the third wiring, the fourth wiring is parallel to the data line extension direction, and the fourth wiring overlaps the common electrode layer.

The embodiment of the present application also provides a display panel, comprising a display region and a redundancy pixel region located on at least one side of the display region, wherein the display panel comprises:
an array substrate comprising a first base and a common wiring disposed on the first base, wherein the common wiring comprises a first wiring, and the first wiring is disposed in the redundancy pixel region;
an opposite substrate disposed opposite to the array substrate, wherein the opposite substrate comprises a second base and a common electrode layer disposed on a side of the second base near the array substrate, and the common electrode layer is disposed in the display region and the redundancy pixel region; and
a liquid crystal layer, the liquid crystal layer disposed between the array substrate and the opposite substrate and extending in the redundancy pixel region and the display region, wherein the liquid crystal layer in the redundancy pixel region is located between the first wiring and the common electrode layer;
wherein along a thickness direction of the display panel, the first wiring overlaps the common electrode layer, when the display panel is in a display state, an absolute value of a difference between a voltage inputted to the first wiring and a voltage inputted to the common electrode layer ranges from 0 to 1 volt.

A first wiring is disposed in a region of the array substrate corresponding to the redundancy pixel region, namely, the first wiring is disposed in an edge region of the display region, and the first wiring overlaps the common electrode layer. under an electrifying condition, the first wiring and common electrode layer have the same or substantially the same voltage such that the liquid crystals in the overlapping region of the first wiring and the common electrode layer almost don't rotate or completely don't rotate such that the overlapping region of the first wiring and the common electrode layer 22 displays a black image to lower a risk of uneven brightness of an edge of the display region.

Optionally, in some embodiments of the present application, the array substrate further comprises a thin film transistor array layer, an insulation layer, and a pixel electrode layer, the thin film transistor array layer is disposed on the first base, the insulation layer is disposed on the thin film transistor array layer, and the pixel electrode layer is disposed on the insulation layer; and
the pixel electrode layer comprises a pixel electrode and a redundancy pixel electrode, the pixel electrode is disposed in the display region, the redundancy pixel electrode is disposed in the redundancy pixel region, and at least one part of the redundancy pixel electrode is multiplexed as a part of the first wiring.

Using at least one part of the redundancy pixel electrode as a part of the first wiring of the common wiring omits an additional process for manufacturing the first wiring, and the same process can be employed to form the pixel electrode and the first wiring, which saves a layout space.

Optionally, in some embodiments of the present application, the first wiring further comprises a connection portion, and in the redundancy pixel region, the connection portion is connected between the first wiring and the redundancy pixel electrode to form an entire plate structure or a patterned structure.

The first wiring is disposed in form of an entire piece in the redundancy pixel region, which can maximally make the edge of the display region display a black image in a display state to further maximally reduce the risk of uneven brightness of the edge of the display region.

Optionally, in some embodiments of the present application, the display panel further comprises an outer periphery region, the outer periphery region surrounds an outer periphery side of the display region, the redundancy pixel region is disposed between the outer periphery region and the display region, the common wiring further comprises at least one second wiring, the at least one second wiring is disposed in the outer periphery region, the array substrate further comprises a bonding pad disposed on the first base, the bonding pad is located on a side of the outer periphery region, an end of the second wiring is connected to the first wiring, and another end of the second wiring is connected to the bonding pad.

The second wiring is configured to provide the first wiring with a voltage signal.

Optionally, in some embodiments of the present application, an edge of the first wiring surrounding the display region forms a closed loop structure.

Using the annular first wiring surrounding the edge of the display region lowers the risk of uneven brightness of a periphery of the display region to further improve a display effect of the display panel.

Optionally, in some embodiments of the present application, the second wirings comprise a first sub-line and a second sub-line, the bonding pad comprises a first bonding pad and a second bonding pad, an end of the first sub-line is connected to a side of the first wiring away from the bonding pad, another end of the first sub-line is connected to the first bonding pad, an end of the second sub-line is connected to a side of the first wiring near the bonding pad, and another end of the second sub-line is connected to the second bonding pad.

Using the first sub-line and the second sub-line connecting different regions of the first wiring achieves effects of lowering a load and signal delay.

Optionally, in some embodiments of the present application, in adjacent two of the second sub-lines, the two the second sub-lines commonly share a partial section, the partial section commonly shared is a common line section, and the common line section is located on a side near the first wiring and is connected to the first wiring.

Using two second sub-lines commonly sharing a partial section not only achieves an effect of lowering a load but also reduces a layout apace of wirings.

Optionally, in some embodiments of the present application, the array substrate further comprises a gate electrode driver circuit located in the outer periphery region, and the gate electrode driver circuit is disposed on a side of the redundancy pixel region away from the display region; and
the first sub-line is located on an outer side of the gate electrode driver circuit.

Optionally, in some embodiments of the present application, the thin film transistor array layer further comprises a scan line, the common wiring further comprises a third wiring connected to the first wiring, the third wiring is parallel to the scan line extension direction, and the third wiring overlaps the common electrode layer.

Such disposing makes no rotation of liquid crystals in an overlapping region of the third wiring and the common electrode layer in a display state such that a black image is displayed, which can achieve an effect of omitting a part of a black matrix layer.

Optionally, in some embodiments of the present application, the thin film transistor array layer further comprises a data line, the common wiring further comprises a fourth wiring connected to the first wiring, the fourth wiring is connected to the third wiring, the fourth wiring is parallel to the data line extension direction, and the fourth wiring overlaps the common electrode layer.

Such disposing makes no rotation of liquid crystals in an overlapping region of the fourth wiring and the common electrode layer in a display state such that a black image is displayed, which can achieve an effect of omitting a part of a black matrix layer.

Optionally, in some embodiments of the present application, the array substrate further comprises a color filter layer, a passivation layer, and a first alignment layer, the color filter layer is disposed on the insulation layer, the passivation layer is disposed on the color filter layer, the pixel electrode layer is disposed on the passivation layer, the first alignment layer is disposed on the pixel electrode layer; and the opposite substrate further comprises a black matrix layer and a second alignment layer, the black matrix layer is disposed on a surface of the second base near the liquid crystal layer, the common electrode layer is disposed on a surface of the black matrix layer near the liquid crystal layer, and the second alignment layer is disposed on a surface of the common electrode layer near the liquid crystal layer.

Optionally, in some embodiments of the present application, the array substrate further comprises first alignment layer, the first alignment layer is disposed on the pixel electrode layer; and the opposite substrate further comprises a black matrix layer, a color filter layer and a second alignment layer, the black matrix layer is disposed on a surface of the second base near the liquid crystal layer, the color filter layer is disposed on a surface of the second base near the liquid crystal layer, the color filter layer covers a part of the black matrix layer, the common electrode layer is disposed on a surface of the color filter layer near the liquid crystal layer, and the second alignment layer is disposed on a surface of the common electrode layer near the liquid crystal layer.

Advantages

The embodiment of the present application provides a display panel comprising a display region and a redundancy pixel region located on at least one side of the display region; the display panel comprises an array substrate and an opposite substrate; the array substrate comprises a first base and a common wiring disposed on the first base; the common wiring comprises a first wiring, the first wiring is disposed in redundancy pixel region and near display region; the opposite substrate comprises a second base and a disposed on a common electrode layer side of the second base near array substrate, the common electrode layer is disposed in the display region and the redundancy pixel region; the liquid crystal layer is disposed between the array substrate and the opposite substrate; wherein along a thickness direction of the display panel, the first wiring overlaps the common electrode layer; when the display panel is in a display state, an absolute value of a difference between a voltage inputted to the first wiring and a voltage inputted to the common electrode layer ranges from 0 to 1 volt.

The present application disposes the first wiring in a region of the array substrate corresponding to the redundancy pixel region, namely, the first wiring is disposed in an edge region of the display region, and the first wiring overlaps the common electrode layer. Under an electrifying condition, first wiring and common electrode layer have the same voltage or substantially the same voltage (an absolute value of a difference between a voltage inputted to the first wiring and a voltage inputted to the common electrode layer ranges from 0 to 1 volt) such that liquid crystals of an overlapping region between the first wiring and the common electrode layer almost don't rotate or completely don't rotate to make an overlapping region between the first wiring and the common electrode layer have no light leakage such that a risk of uneven brightness of the edge of the display region is lowered.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper" and "lower", when not specified to the contrary explanation, usually refer to the upper and lower states of the device in actual use or working conditions, specifically according to the direction of the figures in the drawings. Furthermore, "inner" and "outer" refer to the outline of the device.

The embodiment of the present application provides a display panel described in detail as follows. It should be explained that the order of descriptions in the following embodiments is not to limit the preferred order of the embodiments.

Figure 1:
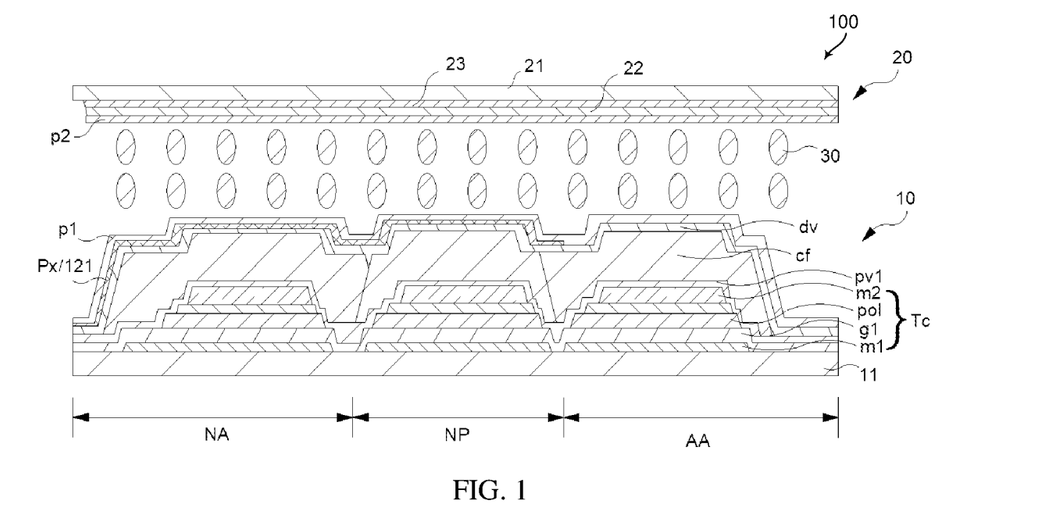
FIG. 1 is a schematic cross-sectional structural view of a display panel provided by a first embodiment of the present application.
Figure 2:
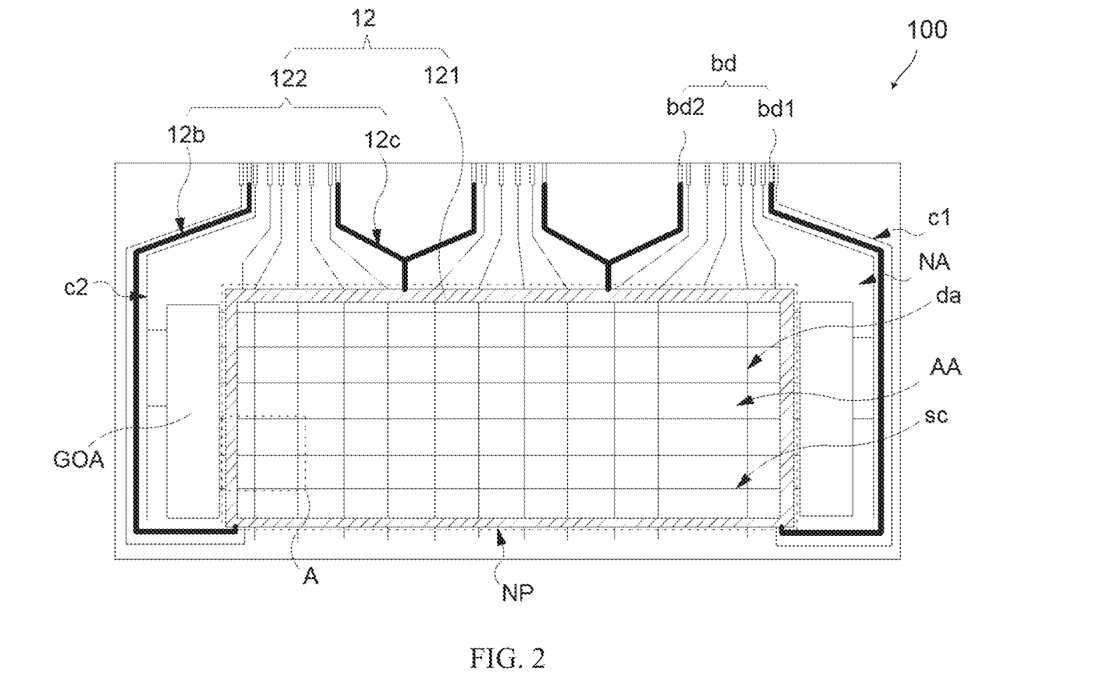
FIG. 2 is a schematic top structural view of an array substrate of the display panel provided by the first embodiment of the present application.

With reference to FIGS. 1 and 2, a first embodiment of the present application provides a display panel 100 comprising a display region AA and a redundancy pixel region NP located on at least one side of the display region AA. The display panel 100 comprises an array substrate 10, an opposite substrate 20, and a liquid crystal layer 30. The opposite substrate 20 is disposed opposite to the array substrate 10. The liquid crystal layer 30 is disposed between the array substrate 10 and the opposite substrate 20.

The array substrate 10 comprises a first base 11 and a common wiring 12 disposed on the first base 11. The common wiring 12 comprises a first wiring 121. The first wiring 121 is disposed on the redundancy pixel region NP.

The opposite substrate 20 comprises a second base 21 and a common electrode layer 22 disposed on a side of the second base 21 near the array substrate 10. The common electrode layer 22 is disposed in the display region AA and the redundancy pixel region NP.

The liquid crystal layer 30 extending in the redundancy pixel region NP and the display region AA. The liquid crystal layer 30 in the redundancy pixel region NP is located between the first wiring 121 and the common electrode layer 22.

Along a thickness direction of the display panel 100, the first wiring 121 overlaps the common electrode layer 22. When the display panel 100 is in a display state, an absolute value of a difference between a voltage inputted in the first wiring 121 and a voltage inputted in the common electrode layer 22 ranges from 0 to 1 volt.

The first embodiment of the present application disposes the first wiring 121 in a region of the array substrate 10 corresponding to the redundancy pixel region NP, namely, the first wiring 121 is disposed in an edge region of the display region AA, the first wiring 121 overlaps the common electrode layer 22. Under an electrifying condition, the first wiring 121 and the common electrode layer 22 have the same voltage or substantially the same voltage (the absolute value of the difference between the voltage inputted in the first wiring 121 and the voltage inputted in the common electrode layer 22 ranges from 0 to 1 volt) such that liquid crystals of an overlapping region between the first wiring 121 and the common electrode layer 22 almost don't rotate or completely don't rotate to make an overlapping region between the first wiring 121 and the common electrode layer 22 have no light leakage, which reduces uneven brightness of the display region AA edge brightness.

Optionally, the absolute value of the difference between the voltage inputted in the first wiring 121 and the voltage inputted in the common electrode layer 22 can be 0 volt (V), 0.2V, 0.4V, 0.6V, 0.8V, or 1V.

In the present embodiment, the voltage inputted in the first wiring 121 can be equal to the voltage inputted in the common electrode layer 22. Namely, the absolute value of the difference between the voltage inputted in the first wiring 121 and the voltage inputted in the common electrode layer 22 can be 0V.

In some embodiments, the voltage inputted in the first wiring 121 can be greater than or less than the voltage inputted in the common electrode layer 22.

In another aspect, in brightness of a displayed image, when the absolute value of the difference between the voltage inputted in the first wiring 121 and the voltage inputted in the common electrode layer 22 is 0, brightness in the overlapping region is set as A brightness. When the absolute value of the difference between the voltage inputted in the first wiring 121 and the voltage inputted in the common electrode layer 22 is 1, the brightness of the overlapping region is set as B brightness. Under a L0 grayscale of a viewing angle of 0 degree (black image), A brightness to B brightness=0 to 0.0017 lux, for example, it can be 0 lux, 0.0005 lux, 0.001 lux or 0.0017 lux. Under a L255 grayscale of the viewing angle of 0 degree (white image), A brightness to B brightness=0 to 0.3 lux, for example, it can be 0 lux, 0.1 lux, 0.2 lux or 0.3 lux. Under such condition, it can be determined that the overlapping region between the first wiring 121 and the common electrode layer 22 have no light leakage.

Optionally, the first wiring 121 can also extend out of the redundancy pixel region NP.

Optionally, the array substrate 10 further comprises a thin film transistor array layer Tc, an insulation layer pv1, and a pixel electrode layer Px. The thin film transistor array layer Tc is disposed on the first base 11. The insulation layer pv1 is disposed on the thin film transistor array layer Tc. The pixel electrode layer Px is disposed on the insulation layer pv1.

Figure 3:
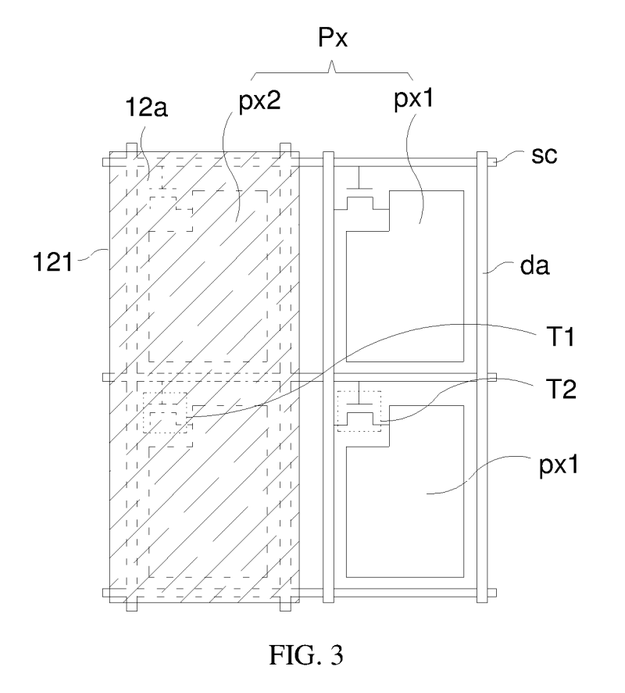
FIG. 3 is an enlarged view of a portion A in FIG. 2.

With reference to FIG. 3, the pixel electrode layer Px comprises a pixel electrode px1 and a redundancy pixel electrode px2. The pixel electrode px1 is disposed in the display region AA. The redundancy pixel electrode px2 is disposed in the redundancy pixel region NP. At least one part of the redundancy pixel electrode px2 is multiplexed as a part of the first wiring 121.

It should be explained that the redundancy pixel electrode px2 is disconnected from a corresponding thin film transistor, namely, no signal is transmitted between the redundancy pixel electrode px2 and the corresponding thin film transistor.

Optionally, a material of the pixel electrode layer Px can be metal oxide such as indium tin oxide or indium zinc oxide.

The display panel 100 of the first embodiment uses at least one part of the redundancy pixel electrode px2 as a part of the first wiring 121 in the common wiring 12 to skip an additional process for manufacturing the first wiring 121, and the same process can be used to form the pixel electrode px1 and the first wiring 121 to save a layout space.

Optionally, the thin film transistor array layer Tc comprises a first metal layer m1, a gate electrode insulation layer g1, an active layer pol, and a second metal layer m2 sequentially stacked on the first base 11. The insulation layer pv1 is disposed on the second metal layer m2.

The first metal layer m1 comprises a scan line sc, a first gate electrode, and a second gate electrode. The second metal layer m2 comprises a data line da, a first a source electrode, a second source electrode, a first drain electrode, and a second drain electrode. The active layer pol comprises a first semiconductor portion and a second semiconductor portion.

The scan line sc and the data line da are intersected. The first gate electrode, the first semiconductor portion, the first source electrode, and the first drain electrode form a first thin film transistor T1. The second gate electrode, the second semiconductor portion, the second source electrode, and the second drain electrode form a second thin film transistor T2.

The first thin film transistor T1 corresponds to the pixel electrode px1 and is located in the display region AA. The second thin film transistor T2 corresponds to the redundancy pixel electrode px2, and is located in the redundancy pixel region NP.

The first gate electrode of the first thin film transistor T1 is connected to the scan line sc, the first source electrode of the first thin film transistor T1 is connected to the data line da, and first drain electrode of the first thin film transistor T1 is connected to the pixel electrode px1. The second gate electrode of the second thin film transistor T2 is connected to the scan line sc, and the second source electrode of the second thin film transistor T2 is disconnected from the data line da. The second drain electrode of the second thin film transistor T2 is connected to the redundancy pixel electrode px2.

In some embodiments, it also can be that the second source electrode of the second thin film transistor T2 is connected to the data line da, and the second drain electrode of the second thin film transistor T2 is disconnected from the redundancy pixel electrode px2.

It should be explained that in the first embodiment the first thin film transistor T1 and the second thin film transistor T2 are bottom gate thin film transistors, but are not limited thereto, for example the transistors can be top gate thin film transistors or dual gate thin film transistors.

Optionally, with reference to FIG. 3, the first wiring 121 further comprises a connection portion 12a. In the redundancy pixel region NP, the connection portion 12a is connected between the first wiring 121 and the redundancy pixel electrode px2 to form an entire plate structure or a patterned structure.

It should be explained that FIG. 3 shows a schematic view of the first wiring 121 presenting an entire plate structure in the redundancy pixel region NP. The first wiring 121 is disposed in form of an entire plate in the redundancy pixel region NP, which can maximally makes an edge of the display region AA display a black image in the display state to further maximally reduce a risk of uneven brightness of the edge of the display region AA.

When the first wiring 121 presents the patterned structure in the redundancy pixel region NP, a width of the connection portion 12a is less than a width of the redundancy pixel electrode px2. Namely, the first wiring 121 has a hollow portion.

Optionally, with reference to FIG. 2, the display panel 100 further comprises an outer periphery region NA. The outer periphery region NA surrounds an outer periphery side of the display region AA. The redundancy pixel region NP is disposed between the outer periphery region NA and the display region AA. The common wiring 12 further comprises at least one second wiring 122. The at least one second wiring 122 is disposed in the outer periphery region NA.

The array substrate 10 further comprises a bonding pad bd disposed on the first base 11. The bonding pad bd is located on a side of the outer periphery region NA. an end of the second wiring 122 is connected to the first wiring 121, an another end of the second wiring 122 is connected to the bonding pad bd.

The second wiring 122 is configured to provide the first wiring 121 with a voltage signal.

Optionally, an edge of the first wiring 121 surrounding the display region AA forms a closed loop structure. using the edge of the annular first wiring 121 surrounding the display region AA lowers a risk of uneven brightness of a periphery edge of the display region AA to further improve a display effect of the display panel 100.

Optionally, the first wiring 121 can also extend out of the redundancy pixel region NP and be located in the outer periphery region NA.

Optionally, a number of the redundancy pixel region NP is four, the four redundancy pixel regions NP are sequentially connected around a periphery of the display region AA. Therefore, the redundancy pixel electrodes px2 in the four redundancy pixel regions NP are connected through the connection portion 12a to form the annular first wiring 121.

In some embodiments, a number of the redundancy pixel region NP is two, the two redundancy pixel regions NP are disposed on two sides of the display region AA. The redundancy pixel electrodes px2 in the two redundancy pixel regions NP are connected through the connection portion 12a to form first connection sections, the two first connection sections are disposed oppositely. The first wiring further comprises two second connection sections disposed oppositely. The second connection sections are disposed on two other sides of the display region AA. The first connection sections and second connection sections are connected alternately to form the annular first wiring 121.

Optionally, the second wiring 122 comprises a first sub-line 12b and a second sub-line 12c. The bonding pad bd comprises a first bonding pad bd1 and a second bonding pad bd2. An end of the first sub-line 12b is connected to a side of the first wiring 121 away from the bonding pad bd, and another end of the first sub-line 12b is connected to the first bonding pad bd1. An end of the second sub-line 12c is connected to a side of the first wiring 121 near the bonding pad bd, and another end of the second sub-line 12c is connected to the second bonding pad bd2.

Using the first sub-line 12b and the second sub-line 12c to connect different regions of the first wiring 121 achieves an effect of lowering a load and signal delay.

Optionally, in adjacent two of the second sub-lines 12c, the two second sub-lines 12c commonly share a partial section, the commonly shared partial section is a common line section. The common line section is located on a side near the first wiring 121 and is connected to the first wiring 121.

Using the two second sub-lines 12c commonly sharing the partial section not only achieves an effect of lowering the load but also reduces a layout space of wirings.

Optionally, the array substrate 10 further comprises a gate electrode driver circuit GOA located in the outer periphery region NA. The gate electrode driver circuit GOA is disposed on a side of the redundancy pixel region NA away from the display region AA. The first sub-line 12b is located on an outer side of the gate electrode driver circuit GOA. The scan line sc is connected to the gate electrode driver circuit GOA.

Optionally, the first wiring 121 and the second wiring 122 are disposed in the same layer, and both have the same material.

In some embodiments, the first wiring 121 and the second wiring 122 can be disposed in different layers. The second wiring 122 is formed on the first metal layer m1 or the second metal layer m2. The first wiring 121 is connected to the second wiring 122 through a via hole. Disposing the first wiring 121 and the second wiring 122 in different layers can achieve an effect of reducing a layout space.

Optionally, the array substrate 10 further comprises a first signal line c1 disposed on a side of the first sub-line 12b away from the gate electrode driver circuit GOA, and the first signal line c1 is electrically connected to the common electrode layer 22.

Optionally, the array substrate 10 further comprises a second signal line c2. The second signal line c2 is disposed on a side of the first sub-line 12b near the gate electrode driver circuit GOA. The second signal line c2 is connected to the gate electrode driver circuit GOA.

Optionally, the array substrate 10 further comprises a color filter layer cf, a passivation layer dv, and a first alignment layer p1. The color filter layer cf is disposed on the insulation layer pv1. The passivation layer dv is disposed on the color filter layer cf. The pixel electrode layer Px is disposed on the passivation layer dv. The first alignment layer p1 is disposed on the pixel electrode layer Px.

The opposite substrate 20 further comprises a black matrix layer 23 and a second alignment layer p2. The black matrix layer 23 is disposed on a surface of the second base 21 near the liquid crystal layer 30. The common electrode layer 22 is disposed on a surface of the black matrix layer 23 near the liquid crystal layer 30. The second alignment layer p2 is disposed on a surface of the common electrode layer 22 near the liquid crystal layer 30.

Figure 4:
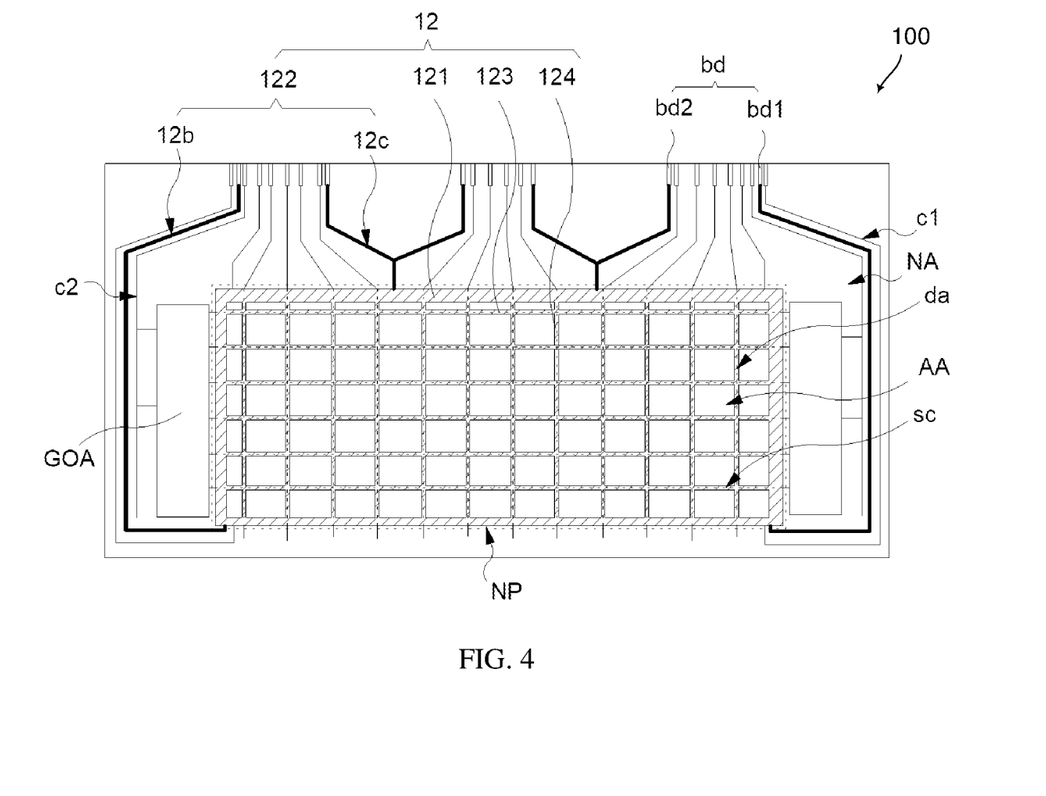
FIG. 4 is a schematic top structural view of an array substrate of the display panel provided by a second embodiment of the present application.

With reference to FIG. 4, a difference of the display panel 100 of the present second embodiment from the display panel 100 of the first embodiment is that: The common wiring 12 further comprises a third wiring 123 connected to the first wiring 121. the third wiring 123 is parallel to the scan line sc extension direction. the third wiring 123 overlaps the common electrode layer 22.

As such disposing configuration, when in a display state, liquid crystals in an overlapping region between the third wiring 123 and the common electrode layer 22 don't rotate to show a black image, which can achieve an effect of omitting a part of the black matrix layer 23.

Optionally, the common wiring 12 further comprises a fourth wiring 124 connected to the first wiring 121. The fourth wiring 124 is connected to the third wiring 123. The fourth wiring 124 is parallel to the data line da extension direction. The fourth wiring 124 overlaps the common electrode layer 22.

As such disposing configuration, when in the display state, liquid crystals in the overlapping region between the fourth wiring 124 and the common electrode layer 22 don't rotate to further display a black image, which can achieve an effect of omitting a part of the black matrix layer 23.

The black matrix layer 23 shields the first thin film transistor T1 and the second thin film transistor T2. In some embodiments, the black matrix layer 23 can also shield a part of the data line da and/or the scan line sc.

Figure 5:
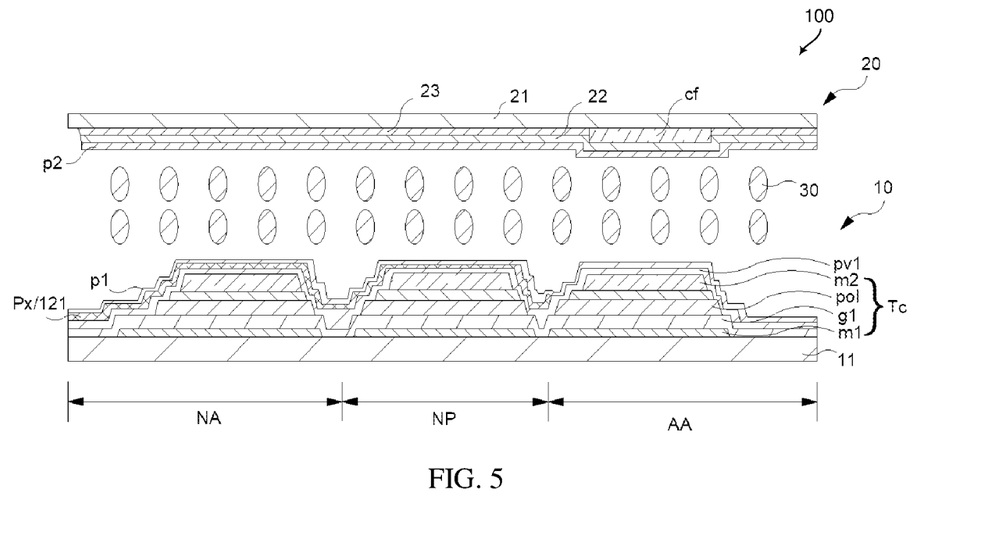
FIG. 5 is a schematic cross-sectional structural view of the display panel provided by a third embodiment of the present application.

With reference to FIG. 5, a difference of the display panel 100 of the third embodiment from the first embodiment and the second embodiment is that: the array substrate 10 further comprises a first alignment layer p1, the first alignment layer p1 is disposed on the pixel electrode layer Px.

The opposite substrate 20 further comprises a black matrix layer 23, a color filter layer cf, and a second alignment layer p2. The black matrix layer 23 is disposed on a surface of the second base 21 near the liquid crystal layer 30. The color filter layer cf3 is disposed on a surface of the second base 21 near the liquid crystal layer 30. the color filter layer cf covers a part of the black matrix layer 23. The common electrode layer 223 is disposed on a surface of the color filter layer cf near the liquid crystal layer 30. the second alignment layer p23 is disposed on a surface of the common electrode layer 22 near the liquid crystal layer 30.

The display panel 100 of the third embodiment, compared to the display panel 100 of the first embodiment or the second embodiment, is a display panel of non-COA framework, namely, the color filter layer cf is disposed in the opposite substrate 20.

The third embodiment of the present application provides a display panel 100 comprising a display region AA and a redundancy pixel region NP located on at least one side of the display region AA. The display panel 100 comprises an array substrate 10, an opposite substrate 20, and a liquid crystal layer 30. The opposite substrate 20 is disposed opposite to the array substrate 10. The liquid crystal layer 30 is disposed between the array substrate 10 and the opposite substrate 20.

The array substrate 10 comprises a first base 11 and a common wiring 12 disposed on the first base 11. the common wiring 12 comprises a first wiring 121. The first wiring 121 is disposed in the redundancy pixel region NP and near the display region AA.

The opposite substrate 20 comprises a second base 21 and a common electrode layer 22 disposed on a side of the second base 21 near the array substrate 10. The common electrode layer 22 is disposed in the display region AA and the redundancy pixel region NP.

Along a thickness direction of the display panel 100, the first wiring 121 overlaps the common electrode layer 22. When the display panel 100 is in a display state, an overlapping region of the first wiring 121 and the common electrode layer 22 is a black image.

The present application third embodiment disposes the first wiring 121 in a region of the array substrate 10 corresponding to the redundancy pixel region NP, namely, the first wiring 121 is disposed in an edge region of the display region AA. The first wiring 121 overlaps the common electrode layer 22. Under an electrifying condition, the first wiring 121 and the common electrode layer 22 have the same voltage or substantially the same voltage such that liquid crystals of an overlapping region between the first wiring 121 and the common electrode layer 22 almost don't rotate or completely don't rotate to make the overlapping region between the first wiring 121 and the common electrode layer 22 show a black image, which reduces uneven brightness of the display region AA edge brightness.

The display panel provided by the embodiment of the present application is described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A display panel, comprising a display region and a redundancy pixel region located on at least one side of the display region, wherein the display panel comprises:
   an array substrate comprising a first base and a common wiring disposed on the first base, wherein the common wiring comprises a first wiring, and the first wiring is disposed in the redundancy pixel region;
   an opposite substrate disposed opposite to the array substrate, wherein the opposite substrate comprises a second base and a common electrode layer disposed on a side of the second base near the array substrate, and the common electrode layer is disposed in the display region and the redundancy pixel region; and
   a liquid crystal layer, the liquid crystal layer disposed between the array substrate and the opposite substrate and extending in the redundancy pixel region and the display region, wherein the liquid crystal layer in the redundancy pixel region is located between the first wiring and the common electrode layer;
   wherein, along a thickness direction of the display panel, the first wiring overlaps the common electrode layer, when the display panel is in a display state, under a L0 grayscale of a viewing angle of 0 degree, image brightness of an overlapping region between the first wiring and the common electrode layer ranges from 0 to 0.0017 lux;
   wherein the array substrate further comprises a thin film transistor array layer, an insulation layer, and a pixel electrode layer, the thin film transistor array layer is disposed on the first base, the insulation layer is disposed on the thin film transistor array layer, and the pixel electrode layer is disposed on the insulation layer;

wherein the pixel electrode layer comprises a pixel electrode and a redundancy pixel electrode, the pixel electrode is disposed in the display region, the redundancy pixel electrode is disposed in the redundancy pixel region, and at least one part of the redundancy pixel electrode is multiplexed as a part of the first wiring;

wherein the first wiring further comprises a connection portion, and in the redundancy pixel region, the connection portion is connected between the first wiring and the redundancy pixel electrode to form an entire plate structure or a patterned structure.

2. The display panel according to claim 1, wherein the display panel further comprises an outer periphery region, the outer periphery region surrounds an outer periphery side of the display region, the redundancy pixel region is disposed between the outer periphery region and the display region, the common wiring further comprises at least one second wiring, the at least one second wiring is disposed in the outer periphery region, the array substrate further comprises a bonding pad disposed on the first base, the bonding pad is located on a side of the outer periphery region, an end of the second wiring is connected to the first wiring, and another end of the second wiring is connected to the bonding pad.

3. The display panel according to claim 2, wherein an edge of the first wiring surrounding the display region forms a closed loop structure.

4. The display panel according to claim 3, wherein the second wiring is multiple, each of the second wirings comprises a first sub-line and a second sub-line, the bonding pad comprises a first bonding pad and a second bonding pad, an end of the first sub-line is connected to a side of the first wiring away from the bonding pad, another end of the first sub-line is connected to the first bonding pad, an end of the second sub-line is connected to a side of the first wiring near the bonding pad, and another end of the second sub-line is connected to the second bonding pad.

5. The display panel according to claim 4, wherein in adjacent two of the second sub-lines, the two the second sub-lines commonly share a partial section, the partial section commonly shared is a common line section, and the common line section is located on a side near the first wiring and is connected to the first wiring.

6. The display panel according to claim 2, wherein the thin film transistor array layer further comprises a scan line; the common wiring further comprises a third wiring connected to the first wiring, the third wiring is parallel to a scan line extension direction, and the third wiring overlaps the common electrode layer.

7. The display panel according to claim 6, wherein the thin film transistor array layer further comprises a data line, the common wiring further comprises a fourth wiring connected to the first wiring, the fourth wiring is connected to the third wiring, the fourth wiring is parallel to a data line extension direction, and the fourth wiring overlaps the common electrode layer.

8. A display panel, comprising a display region and a redundancy pixel region located on at least one side of the display region, wherein the display panel comprises:

an array substrate comprising a first base and a common wiring disposed on the first base, wherein the common wiring comprises a first wiring, and the first wiring is disposed in the redundancy pixel region;

an opposite substrate disposed opposite to the array substrate, wherein the opposite substrate comprises a second base and a common electrode layer disposed on a side of the second base near the array substrate, and the common electrode layer is disposed in the display region and the redundancy pixel region; and a liquid crystal layer, the liquid crystal layer disposed between the array substrate and the opposite substrate and extending in the redundancy pixel region and the display region, wherein the liquid crystal layer in the redundancy pixel region is located between the first wiring and the common electrode layer;

wherein along a thickness direction of the display panel, the first wiring overlaps the common electrode layer, when the display panel is in a display state, an absolute value of a difference between a voltage inputted to the first wiring and a voltage inputted to the common electrode layer ranges from 0 to 1 volt;

wherein the array substrate further comprises a thin film transistor array layer, an insulation layer, and a pixel electrode layer, the thin film transistor array layer is disposed on the first base, the insulation layer is disposed on the thin film transistor array layer, and the pixel electrode layer is disposed on the insulation layer;

wherein the pixel electrode layer comprises a pixel electrode and a redundancy pixel electrode, the pixel electrode is disposed in the display region, the redundancy pixel electrode is disposed in the redundancy pixel region, and at least one part of the redundancy pixel electrode is multiplexed as a part of the first wiring;

wherein the first wiring further comprises a connection portion, and in the redundancy pixel region, the connection portion is connected between the first wiring and the redundancy pixel electrode to form an entire plate structure or a patterned structure.

9. The display panel according to claim 8, wherein the display panel further comprises an outer periphery region, the outer periphery region surrounds an outer periphery side of the display region, the redundancy pixel region is disposed between the outer periphery region and the display region, the common wiring further comprises at least one second wiring, the at least one second wiring is disposed in the outer periphery region, the array substrate further comprises a bonding pad disposed on the first base, the bonding pad is located on a side of the outer periphery region, an end of the second wiring is connected to the first wiring, and another end of the second wiring is connected to the bonding pad.

10. The display panel according to claim 9, wherein an edge of the first wiring surrounding the display region forms a closed loop structure.

11. The display panel according to claim 10, wherein the second wiring is multiple, each of the second wirings comprises a first sub-line and a second sub-line, the bonding pad comprises a first bonding pad and a second bonding pad, an end of the first sub-line is connected to a side of the first wiring away from the bonding pad, another end of the first sub-line is connected to the first bonding pad, an end of the second sub-line is connected to a side of the first wiring near the bonding pad, and another end of the second sub-line is connected to the second bonding pad.

12. The display panel according to claim 11, wherein in adjacent two of the second sub-lines, the two the second sub-lines commonly share a partial section, the partial section commonly shared is a common line section, and the common line section is located on a side near the first wiring and is connected to the first wiring.

13. The display panel according to claim 9, wherein the thin film transistor array layer further comprises a scan line, the common wiring further comprises a third wiring connected to the first wiring, the third wiring is parallel to a scan line extension direction, and the third wiring overlaps the common electrode layer.

14. The display panel according to claim 13, wherein the thin film transistor array layer further comprises a data line, the common wiring further comprises a fourth wiring connected to the first wiring, the fourth wiring is connected to the third wiring, the fourth wiring is parallel to a data line extension direction, and the fourth wiring overlaps the common electrode layer.

15. The display panel according to claim 8, wherein the array substrate further comprises a color filter layer, a passivation layer, and a first alignment layer, the color filter layer is disposed on the insulation layer, the passivation layer is disposed on the color filter layer, the pixel electrode layer is disposed on the passivation layer, the first alignment layer is disposed on the pixel electrode layer; and the opposite substrate further comprises a black matrix layer and a second alignment layer, the black matrix layer is disposed on a surface of the second base near the liquid crystal layer, the common electrode layer is disposed on a surface of the black matrix layer near the liquid crystal layer, and the second alignment layer is disposed on a surface of the common electrode layer near the liquid crystal layer.

16. The display panel according to claim 8, wherein the array substrate further comprises a first alignment layer, the first alignment layer is disposed on the pixel electrode layer; and the opposite substrate further comprises a black matrix layer, a color filter layer and a second alignment layer, the black matrix layer is disposed on a surface of the second base near the liquid crystal layer, the color filter layer is disposed on a surface of the second base near the liquid crystal layer, the color filter layer covers a part of the black matrix layer, the common electrode layer is disposed on a surface of the color filter layer near the liquid crystal layer, and the second alignment layer is disposed on a surface of the common electrode layer near the liquid crystal layer.

* * * * *